(12) United States Patent
Olivas et al.

(10) Patent No.: US 6,173,734 B1
(45) Date of Patent: Jan. 16, 2001

(54) LEAK ARRESTING MECHANICAL FLOW CONTROL VALVE

(75) Inventors: John D. Olivas, Houston, TX (US); Mark C. Martis; Patrick J. Cunningham, both of Redondo Beach, CA (US)

(73) Assignee: Brightvalve LLC, Redondo Beach, CA (US)

( * ) Notice: Under 35 U.S.C. 154(b), the term of this patent shall be extended for 0 days.

(21) Appl. No.: 09/432,993

(22) Filed: Nov. 3, 1999

(51) Int. Cl.[7] .................................................... F16K 17/00
(52) U.S. Cl. ..................... 137/460; 137/458; 137/512.3; 137/614.2
(58) Field of Search ..................... 137/460, 458, 137/512.3, 614.2

(56) References Cited

U.S. PATENT DOCUMENTS

| | | |
|---|---|---|
| 2,970,607 | 2/1961 | Peck et al. . |
| 3,683,957 | 8/1972 | Sands . |
| 4,269,223 * | 5/1981 | Carter et al. ........................ 137/460 |
| 4,383,549 * | 5/1983 | Maldavs ........................... 137/514.7 |
| 4,813,492 | 3/1989 | Biek . |
| 4,976,281 | 12/1990 | Berglund . |
| 5,462,081 * | 10/1995 | Perusek et al. ...................... 137/498 |
| 5,613,518 * | 3/1997 | Rekieski ........................... 137/513.5 |

OTHER PUBLICATIONS

Chem Tec Equipment Company, Excess Flow Valves 3 pages.
Chem Tec Equipment Company, EFV HP Series Manual Reset, 3 pages.
Chem Tec Equipment Company, EFV MRS Series Manual Reset, 3 pages.
Chem Tec Equipment Company EFV Series Manual Reset, 2 pages.
Filterchem, Pressure Relief Valves, 2 pages.

* cited by examiner

Primary Examiner—A. Michael Chambers
Assistant Examiner—Thomas L. McShane
(74) Attorney, Agent, or Firm—Price and Gess

(57) ABSTRACT

A mechanical leak arresting valve is disclosed in which fluid through the valve is limited to a range between a predetermined minimum flow rate and a predetermined maximum flow rate, and where both a small or large downstream leak mechanically causes the valve to lock closed. The present invention uses a locking mechanism triggered by a pressure differential resulting from the downstream leak to block the flow of fluid through the valve until the fluid source upstream is stopped. Reduction of the upstream pressure by the stopping of the fluid source automatically resets the valve without further manipulation.

16 Claims, 5 Drawing Sheets

LEAK ARRESTING MECHANICAL FLOW CONTROL VALVE

BACKGROUND OF THE INVENTION

1. Field of the Invention

The present invention relates generally to flow control valves, and more particularly to leak arresting mechanical flow control valves that regulate fluid flow between a minimum flow rate and a maximum flow rate.

2. Description of Related Art

Valves used in the regulation of fluid flow are well known in the art. Valves can be used to maintain fluid flow in a particular direction, or as a safety feature to prevent too high of a flow rate or too low of a flow rate. Some valves are mechanical devices that use the pressure in a fluid flow to compress a spring or other resisting member, thereby allowing the fluid either to pass through the valve or be blocked by the valve.

The present invention is directed to a flow regulating (or safety) valve which allows a constant fluid flow in a predetermined range, as opposed to a pulse flow. Valves used for this purpose are too numerous to identify, but the present invention includes a new feature not found in the prior art valves, namely, a purely mechanical leak detecting function. That is, a mechanical valve which regulates the fluid flow to maintain a flow rate within a predetermined minimum and maximum flow rate, and further mechanically closes the valve when either a small or large downstream leak occurs. Thus, while prior art safety valves will close shut, and thereby stop the fluid flow if a major leak occurs due to the sudden increase in the fluid flow rate, the prior art valves lack the ability to close shut in the event of a small leak such as might occur due to a small breach in the downstream fluid line or the failure of a downstream component. This situation could be of critical importance if, say, the fluid is hazardous or flammable, if the fluid line is not regularly maintained due to its location or conditions of use, or if subsequent damage from such a line breach would be economically or environmentally unacceptable. The response of the valve may be the only indication that a small leak has occurred. The present invention solves the problem that the prior art valves fail to address.

OBJECTS AND SUMMARY OF THE INVENTION

The present invention is a reliable, mechanical valve which does not rely on any electronics or human interaction to perform its leak arresting function. The leak arresting valve includes a first stage which includes a spring loaded member for limiting the flow rate through the valve to a predetermined range, i.e., between a minimum flow rate and a maximum flow rate. Above a maximum flow rate, a flow arresting element such as a ball, gate, poppet, diaphragm, or other known valve blocking mechanism is driven by the force of the fluid flow resulting in a large pressure differential across the element, into a non-flow position causing fluid flow through the valve to cease. Below the maximum fluid flow rate, the position of the flow arresting element is such that fluid flows by, around, or across the element thereby permitting fluid to pass through the valve. In a second stage of the leak arresting valve, a second flow arresting element is biased in a closed position and requires a minimum flow condition to open the second stage. Below a minimum flow rate the fluid flow is insufficient to open the valve, thereby precluding flow through the valve. Additionally, the second stage is set up such that a locking mechanism will lock the second stage flow arresting element in a closed position upon the occurrence of a small downstream leak, but will open normally under normal operating conditions. The leak arresting function, i.e., the locking of the valve in the closed position, is achieved by the higher pressure upstream, actuating locking members which lock the second stage flow arresting element in the closed position.

Under normal start up condition, the difference in the upstream and downstream pressures with reference to the second stage flow arresting element is large. The second stage flow arresting element transitions due to the pressure difference in a rapid manner past the trigger for the locking mechanism before suitable time is given for the trigger to respond. Conversely, under the influence of a downstream leak, the back pressure on the valve is reduced, and a smaller pressure differential across the second stage flow arresting element is present. The pressure differential is ultimately used to actuate the locking mechanism that restricts the linear translation of the flow arresting element. This configuration will exist even after the differential pressure increases within the normal range. Only after the leak condition is corrected can the valve be reset and returned to a normal configuration. Once the upstream fluid flow is terminated, the pressure differential is eliminated through the valve and all leak conditions, whether small or large, can be reset and all locking members are retracted to their original positions. In this manner, the leak arresting valve resets automatically upon the equalization of the pressure, and mechanically detects the presence of a downstream leak.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a mechanical leak arresting valve.

Figure 1:
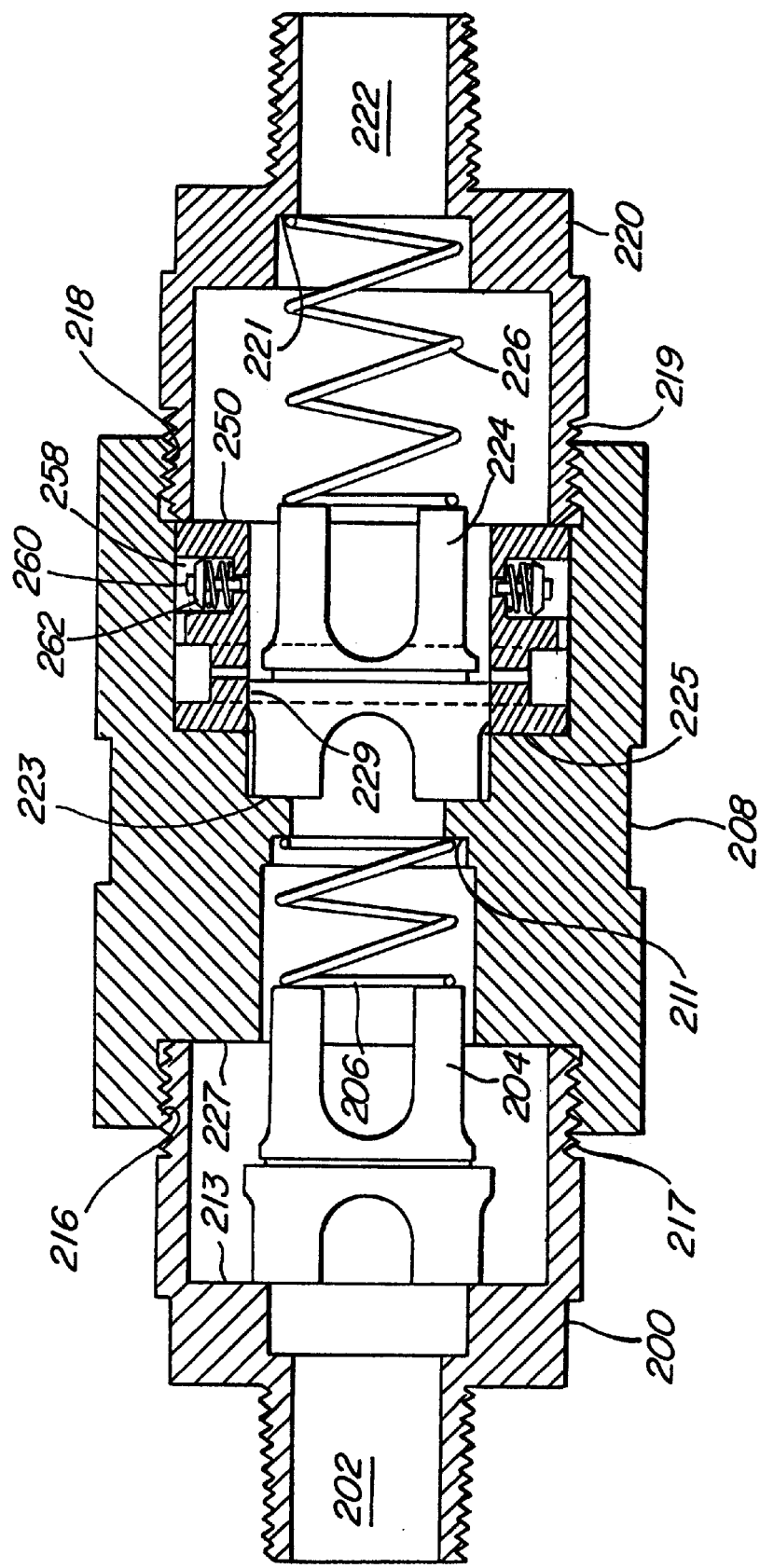
FIG. 1 is a cross-sectional view of the leak arresting valve of the present invention in the absence of a fluid flow.

FIG. 1 illustrates a cross section of one preferred embodiment of the present invention. A valve body 208 is preferably a brass or stainless steel cast, although the specific material will likely depend on the application, and is annular shaped with female threaded ends 216,218. Threaded end 216 receives a threaded housing 200 forming a first stage flow control chamber, and threaded end 218 receives a threaded housing 220 forming the second stage flow control chamber. Housing 200 has a male threaded end 217 which engages the female threaded end 216 of the valve body 208 to form a fluid tight seal. Similarly, the housing 220 has a male threaded end 219 which engages the female threaded end 218 to form a fluid tight seal. The first stage flow control chamber includes an internal channel 202 which conducts fluid into and through the valve, and the second stage fluid control chamber includes internal channel 222 which is in fluidic communication with the first internal channel 202 and forms the passageway through and out of the valve. Accordingly, internal channel 202 is referred to as the upstream portion of the valve where the fluid enters the valve, and internal channel 222 is referred to as the downstream portion of the valve where fluid exits the valve.

As shown in FIG. 1, the first stage flow control chamber includes a flow arresting element 204 such as a gate poppet shown, although any number of flow arresting elements such as balls, cones, etc. are known in the art and may be readily substituted if consistent with the scope of the present invention. Fluid flows around the gate poppet by entering the voids in the cylindrical walls, and the gate poppet will remain in the position shown in FIG. 1 under normal flow conditions. The gate poppet, or flow arresting element 204 is biased by a spring 206 which is supported by the valve body 208 at shoulder 211. The spring 206 biases the flow arresting element 204 against the shoulder 213 of the housing 200 when the fluid flow is less than the maximum fluid flow for the valve (dictated here by the choice of spring 206). Fluid can enter the valve by bypassing the flow arresting element 204 and enter the second stage of the valve.

The second stage flow control chamber also includes a flow arresting element 224 such as a gate poppet shown, and as before other known substitutes may be utilized as long as they are consistent with the scope of the present invention. The flow arresting element 224 is biased by a spring 226 which is supported by the housing 220 at shoulder 221. The spring 226 biases the flow arresting element 224 against the shoulder 223 of the valve body 208 such that, below a minimum fluid flow rate, the valve is closed shut by the seal between the flow arresting element 224 and an annular collar 225 at the sealing interface 229.

Figure 5:
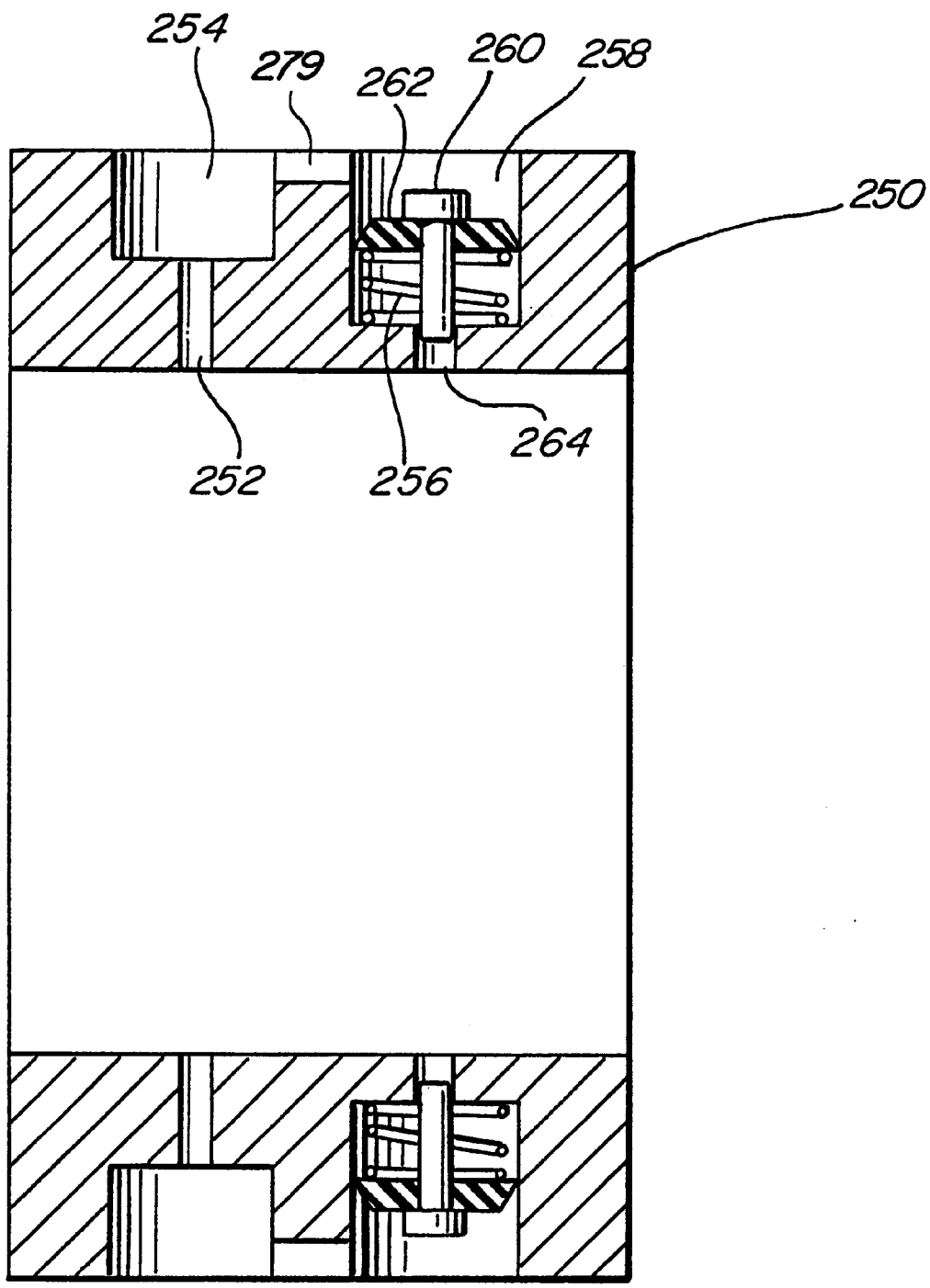
FIG. 5 is an enlarged cross-sectional view of the locking channel sleeve of the present invention.

The annular collar 250 is retained in the valve body 208, such that the annular collar 250 is seated against the shoulder 225 and abutting the housing 220. As shown in more detail in FIG. 5, the annular collar includes narrow capillary channels 252 directed radially from the valve interior and leading to fluid reservoirs 254. The fluid reservoir is formed by the inner surface of the valve body 208 and a groove or void formed on the outer diameter of the annular collar 250. Although two sets of capillary channels and reservoirs are shown, there may be more sets circumferentially spaced about the perimeter of the annular channel as required by the specific application. The reservoir 254 has a second fluid channel 279 leading to a column 258 which houses a piston-like apparatus comprising a pin 260, a washer 262, and a spring 256. The column 258 is in fluidic communication with the interior of the valve channel through bleed orifice 264.

As shown in FIG. 1, the fluid circuit comprising capillary channel 252, fluid reservoir 254, fluid channel 279, column 258, and bleed orifice 264 are all exposed to the same fluid pressure in the static condition, i.e., the downstream fluid pressure. As will be shown, the fluid circuit will also be exposed to the same fluid pressure in the normal operating condition (see FIG. 3). When the pressure at the fluid reservoir 254 is the same as the pressure in the bleed orifice 264, then spring 256 biases the pin and washer (i.e., the pin assembly) out of the interior of the second stage flow control chamber.

Figure 2:
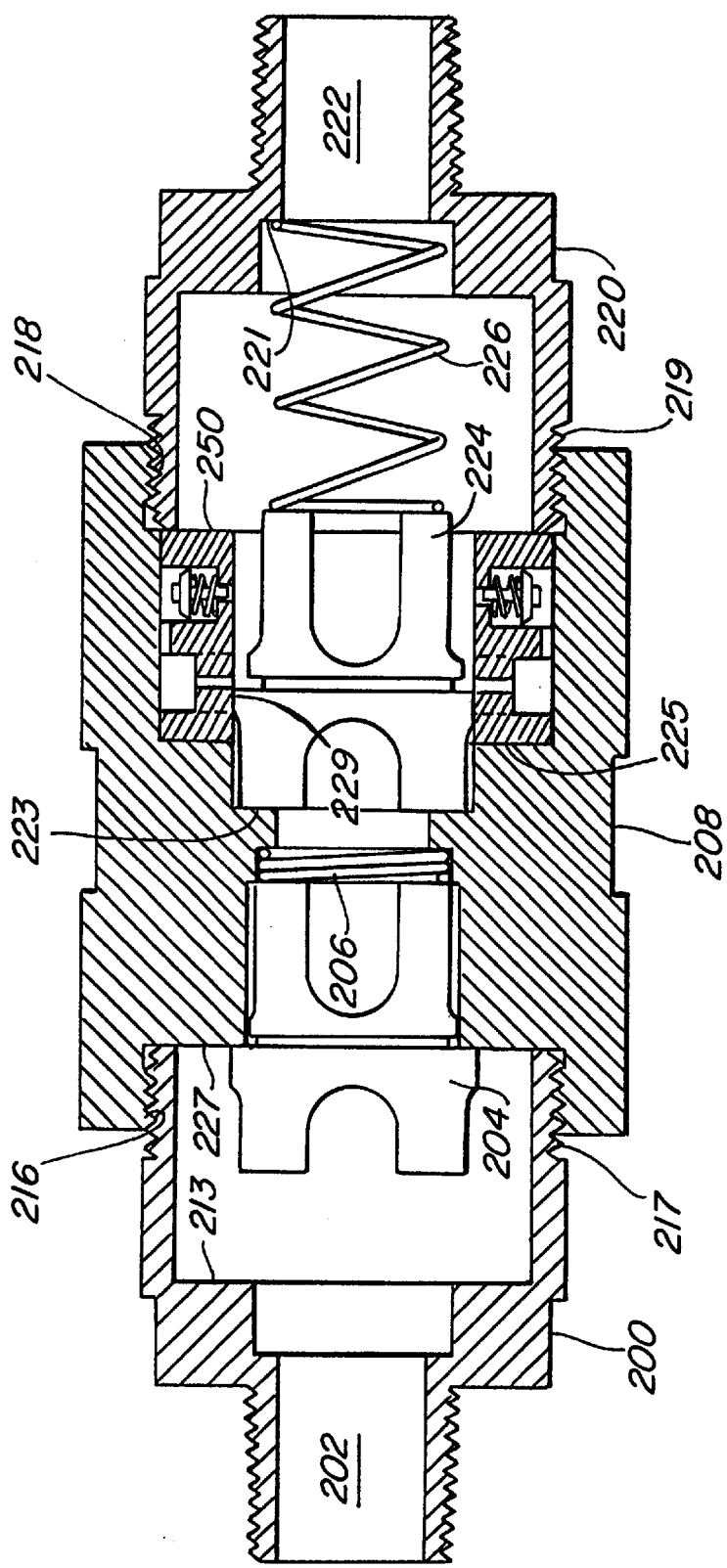
FIG. 2 is a cross-sectional view of the leak arresting valve of the present invention in the excessive fluid flow condition.

FIG. 2 illustrates the condition of the valve under what is known as the excess fluid flow condition. As fluid initially enters the valve, it flows around the flow arresting element 204 in the first stage and, if the flow rate is great enough, forces the second stage flow arresting element 224 to recess thereby opening the second stage of the valve. However, if the flow rate exceeds the maximum design flow rate, the pressure exerted on the flow arresting element 204 by the fluid flow causes the flow arresting element to recede in the first stage chamber against the force of the spring 206, collapsing the spring 206. Above a maximum fluid flow, the flow arresting element completely compresses the spring 206 such that the flow arresting element 204 is moved back into the valve until it abuts shoulder 227 of the valve body 208. At this flow condition, the flow arresting element cooperates with the shoulder 227 of the valve body 208 to close and seal the valve. By choosing the spring 206 accordingly, the first stage flow control chamber can effectively limit the fluid flow rate to values below a preselected maximum flow rate. Because the fluid flow is arrested prior to the second stage flow control chamber, the second stage flow control chamber is unchanged from the no flow condition as shown in FIG. 1.

Figure 3:
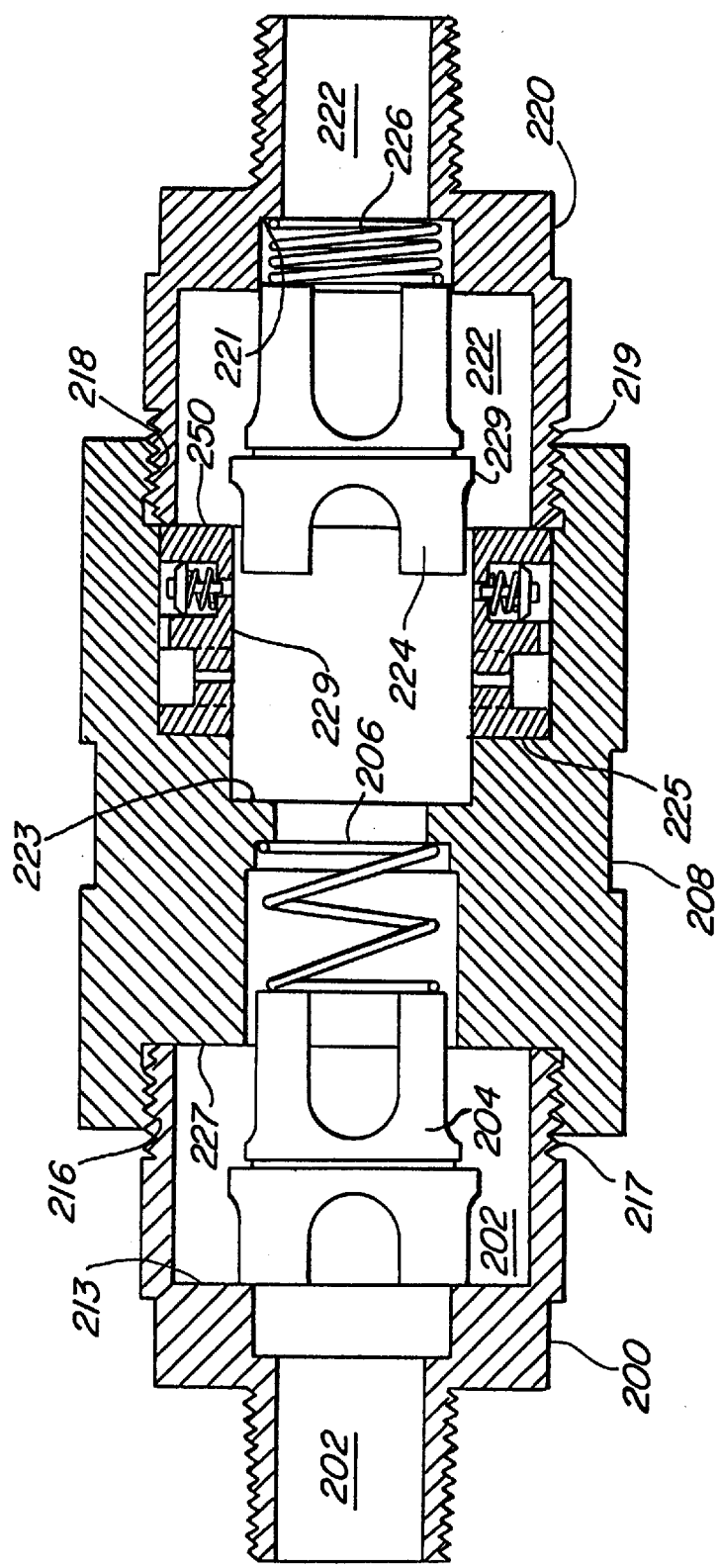
FIG. 3 is a cross-sectional view of the leak arresting valve of the present invention in the operable fluid flow condition.

FIG. 3 illustrates the fluid flow condition through the valve in which the fluid flow rate is steady between the maximum and minimum fluid flow rates as prescribed by the first stage flow control chamber and second stage flow control chamber, respectively. The pressure on the flow arresting element 204 due to the fluid flow is not so great as to position the flow arresting element against shoulder 227. Thus, the flow arresting element 204 resides at its open position permitting fluid to flow around the flow arresting element through the internal channel 202 and into the internal channel 222 of the second stage flow control channel 222. The fluid flow impinges against the flow arresting element 224 in the second stage, and the flow arresting element 224 is moved against the spring 226. This condition results in the flow arresting element 224 operating at an open position where fluid flows around flow arresting element 224 and out the valve. This condition occurs when the sealing interface 229 of the flow arresting element 224, which cooperates with the annular collar to seal the valve in the closed position, recedes past the annular collar 250 thereby allowing fluid to enter the channel 222 of the second stage. With the sealing interface 229 of the flow arresting element still within the annular collar 250, a seal is formed by the periphery of the sealing interface and the internal wall of the annular collar 250 such that no fluid can flow through the valve.

With the flow arresting element translated beyond the annular collar as shown in FIG. 3, it is noted that the fluid circuit which includes the capillary channel 252, reservoir 254, the channel 279, the column 258, and the bleed orifice 264 (see FIG. 5) are all exposed to the same fluid pressure, to wit, the pressure just upstream of the flow arresting element 224. Fluid enters through the capillary channel and after a short delay, completely fills the fluid reservoir. The delay is due to the difference in size between the narrow capillary channel and the relatively larger reservoir. Once the reservoir fills completely, the pressure in the valve at the capillary channel is transferred to the column, and specifically on the washers which form a seal with the column's inner wall. Since the bleed orifice is also in fluid communication with the valve interior, the same pressure will be present on the opposite sides of the washers, negating any effect that the fluid pressure has on the pin assembly. In this situation, the spring 256 acts to bias the pin assembly out of the channel permitting uninhibited movement of the flow arresting element through the channel as the fluid flow increases to the desired flow regime.

Figure 4:
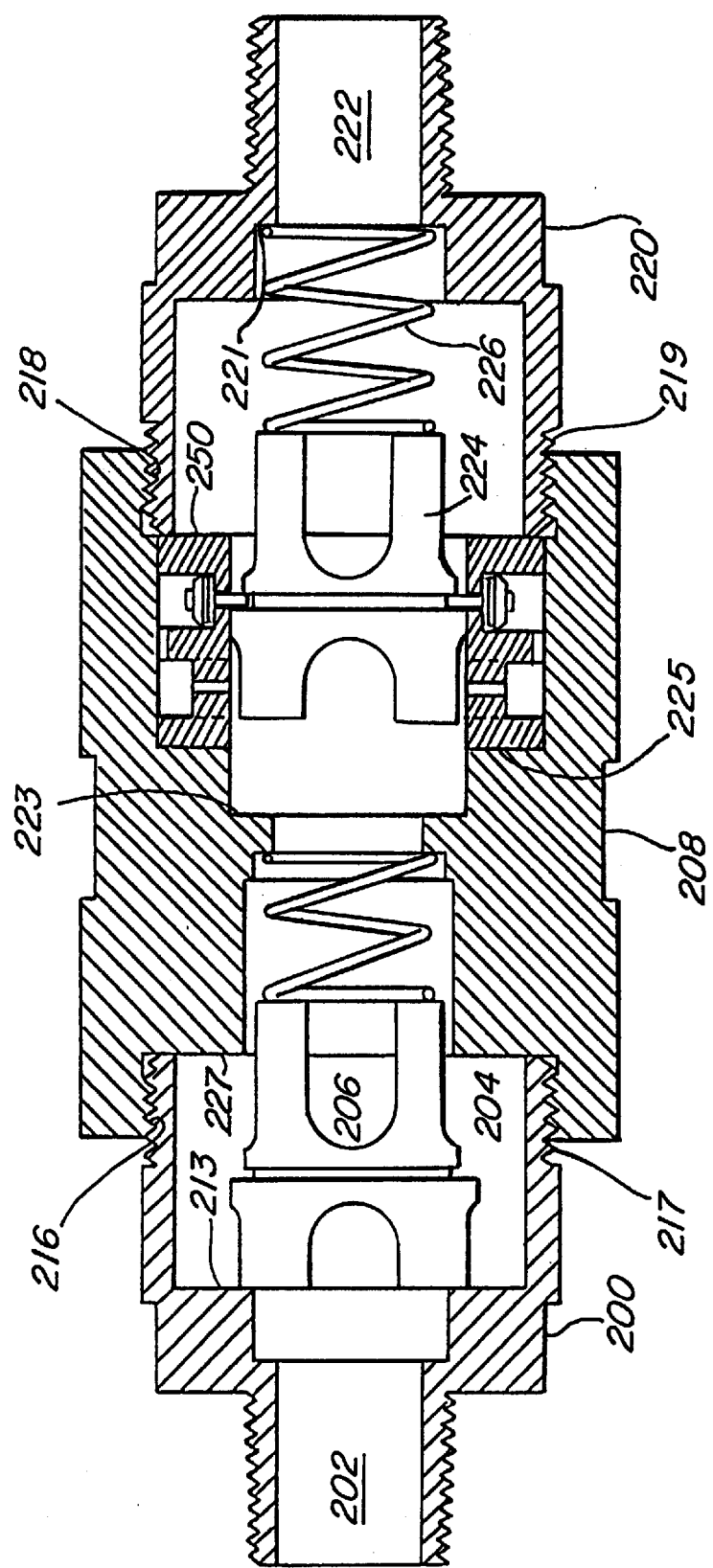
FIG. 4 is a cross-sectional view of the leak arresting valve of the present invention in the downstream small leak condition.

FIG. 4 illustrates the situation in which a downstream leak is present resulting in the automatic locking of the valve, which announces the presence of a downstream leak. If the valve is initially in the static condition, such as that shown in FIG. 1, and a small leak is present far downstream of the valve, the back pressure in the downstream portion of the valve will be reduced due to the leak. The upstream pressure is constant, but the downstream pressure is slowly diminishing as the fluid leaks from the downstream line. The reduction in downstream pressure will communicate to the second stage of the valve, where the equilibrium between the flow arresting element 224 and spring 226 is slowly disturbed. The increasing pressure differential due to the constant upstream pressure and the diminishing downstream pressure causes the flow arresting element to translate gradually from the closed position of FIG. 1 to the open position of FIG. 3.

When the flow arresting element 224 reaches the position as shown in FIG. 4, the pressure at the capillary channel 252 is at the higher upstream pressure, while the pressure at the bleed orifice 264 is at the ever decreasing lower downstream pressure. The higher upstream pressure is communicated to the reservoir 254 and then to the column 258. This pressure differential operates on the washers to move the pin and washers against the force of the spring 256, eventually collapsing the spring 256. In this state, the pin 260 is forced through the bleed orifice 264 and into the chamber where it prevents translation and locks the flow arresting element 224 in the closed position. Furthermore, as long as the leak is present, the pressure in the downstream portion of the valve, i.e. at the bleed orifice 264, will be less than the pressure in the upstream portion of the valve, i.e. the capillary channel 252 and the pin assembly will act as a locking mechanism to maintain the valve in an closed position. If the fluid flow source is disconnected upstream, thereby allowing the pressure differential across the fluid channel to equalize, the pin assembly will no longer experience a pressure differential and be forced back into the column by the force of the spring 256. Thus, one can unlock the valve by disconnecting the source of the fluid, which will automatically reset the valve without further handling of the valve. In this manner, the valve can be completely encased and installed in a line of an existing application without the need for accessing the valve or its interior in order to reset the valve.

The size of the fluid reservoir 254 in comparison to the size of the capillary channel 252 is chosen to create a delay between the existence of a pressure differential across the flow arresting element 224 and the actuation of the locking mechanism. This avoids the undesired locking of the flow arresting element under normal start up conditions, in which a pressure differential will likely exist as the flow builds up to its normal flow rate. In the normal start up condition, the pressure from the fluid flow will cause the flow arresting element to traverse from the extreme position in FIG. 1 to its open position in FIG. 3 in a rapid manner. During the transition, the flow arresting element 224 will necessarily pass the position it occupies in FIG. 4, allowing fluid to enter the reservoir 254 through the capillary channel 252. However, if the relationship between the size of the capillary channel and the size of the fluid reservoir is such that the reservoir adequately pressurizes with fluid after several seconds, the flow arresting element will have traversed to the open position before the reservoir can fill with fluid (if spring 226 is selected properly), and thus the locking mechanism is not triggered during normal start up conditions. Only during a slow leak condition in which the downstream leak causes a slow translation of the flow arresting element 224 will the fluid reservoir have enough time to pressurize and actuate the locking mechanism.

The operation of the just described invention will be illustrated with an example of an application of the present invention, where the application is that of a domestic washing machine water line. The valve is placed in the line which delivers water to the washing machine, and may be located in a place which is not easily accessible. The spring 206 on the upstream or the first stage of the valve is sized such that when the fluid demand from the washing machine is placed on the valve, if the demand exceeds the strength of the spring there is an automatic closure of the gate poppet. What maintains the seal of the gate poppet to the valve body is the line pressure of approximately 60 psi in this example, acting in a direction which is parallel to the long axis of the valve.

The spring which is used for the second stage flow arresting element of the valve is sized such that when the water demand of the washing machine is placed on the valve, for example two gallons per minute, the spring opens immediately. The design of the spring would be such that the flow arresting element would open at a detected pressure differential equal to approximately a one half gallon per minute flow demand. The spring thus offers little resistance in the presence a two gallons per minute flow rate, and the second stage flow control chamber opens quickly under the influence of the requested flow rate.

The spring in the second flow control chamber may be a nonlinear spring that has two movement episodes, or two stages. One movement occurs at a very low demand request, such as 0.1 gallons per minute, where the flow arresting element 224 translates only to the point where the capillary channel is exposed on one side of the sealing interface 229 and the bleed orifice exposed in the grooved channel. This movement allows the locking mechanism to actuate. A second movement would occur at, for example, 0.5 gallons per minute, allowing the flow arresting element to be fully open from that initial flow rate to the desired flow rate.

In addition to a two stage spring design just described, the second stage spring design could alternatively be designed to have a resistance that gradually and continuously increases in stiffness to deflection. Unlike the step function of the two step spring, the continuous nonlinear spring increases in stiffness as it is compressed. Both types of these springs would be sufficient to allow the pressurization of the fluid reservoir with the upstream water pressure, and thereby actuate the locking mechanism. The requirements of the springs that are used in the columns 258 are more stringent than springs 206 and 226 in that when they are exposed to a zero pressure differential across the locking pin the stiffness of the spring is sufficient to retract the pin. It is desirable to have a minimal amount of friction between the pin and the walls of the bleed orifice, and a material such as a low friction polymer is a good choice for the pin material which contacts the wall of the pin column.

It is envisioned that there are many other applications for the valve of the present invention through minor deviations in geometry, material selection and throttling technologies. The concept of the present flow arresting valve can not only be used for residential water, but it can be used for petrochemical, hospital and medical applications. The present invention is ideally suited for any application of a fluid conduit for either liquid or gas that has a requirement to not allow, or to minimize, spills as a result of very low or very high leak rates. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A leak arresting flow control valve comprising:
    a first stage flow control chamber comprising a housing with an internal channel defining a fluid path, and a first flow arresting element biased to permit fluid flow through said internal channel only below a predetermined maximum fluid flow rate; and
    a second stage flow control chamber comprising a housing with an internal channel in fluidic communication with the internal channel of said first stage flow control chamber, and a second flow arresting element biased to permit fluid flow having a flow rate between a minimum fluid flow rate and a maximum fluid flow rate through said internal channel of said second stage flow control chamber, said second stage flow control chamber further comprising:
        a locking mechanism for locking said second flow arresting element in a non-flow position, said locking mechanism actuated by a pressure reduction downstream of said second stage flow control chamber, said locking of said second flow arresting element occuring actuated by a gradual reduction of said downstream pressure.

2. The leak arresting flow control valve of claim 1, where said second flow arresting element occupies a first position within said internal channel of said second stage flow control chamber at said minimum fluid flow rate, and occupies a second position within said internal channel of said second stage flow control chamber at said maximum fluid flow rate, and where said second fluid flow arresting element occupies a third position intermediate to said first position and said second position when said locking mechanism locks said second flow arresting element in the non-flow position.

3. The leak arresting flow control valve of claim 2, wherein said second fluid flow arresting element has a sealing member cooperating with the internal channel of said second stage flow control chamber to define an upstream pressure prior to said sealing member and a downstream pressure beyond said sealing member, and where said locking mechanism is actuated by a pressure differential across said sealing member of said second fluid flow arresting element.

4. The leak arresting flow control valve of claim 3, wherein said second stage flow control chamber includes a fluid reservoir in fluidic communication with said internal channel via a capillary channel, said fluid reservoir further in fluidic communication with said locking mechanism, where a pressure at said capillary channel is communicated to said locking mechanism, and where a size of said capillary channel and a size of said fluid reservoir are selected to effect a predetermined delay in the communication of said pressure at said capillary channel to said locking mechanism.

5. The leak arresting flow control valve of claim 4, wherein said locking mechanism comprises a spring biased piston radially aligned with respect to said internal channel and disposed in a column in fluidic communication with said internal channel of said second stage flow control chamber downstream of said capillary channel, where a higher pressure at said capillary channel compared to a pressure at said piston column causes said piston to deploy from a spring biased position preventing uninhibited movement of said second fluid flow arresting element to a deployed position and restricting movement of said second fluid flow arresting element to a position resulting in a non-flow condition.

6. The leak arresting flow control valve of claim 5, wherein said first stage flow control chamber includes a spring member biasing said flow arresting element, said spring member selected such that:
    where the fluid flow rate is below the maximum fluid flow rate, said spring member biases said flow arresting element in a fluid flow permitting condition; and
    where the fluid flow rate is greater than the maximum fluid flow rate, the fluid flow positions the flow arresting element in a non-flow condition.

7. The leak arresting flow control valve of claim 2, wherein said second flow arresting element is biased in said first position by a spring under a static flow condition, the spring having a non-linear response in a fluid flow rate regime defined by a fluid flow rate between zero and approximately the minimum fluid flow rate, compared to a fluid flow rate regime defined by a fluid flow rate greater than approximately the minimum fluid flow rate.

8. The leak arresting flow control valve of claim 1, wherein said locking mechanism disengages when the downstream pressure becomes substantially no less than an upstream pressure.

9. A leak arresting flow control valve comprising:
    a flow control chamber comprising a housing with an internal channel for communicating fluid therein through, and a flow arresting element biased to permit fluid flow having a flow rate between a minimum fluid flow rate and a maximum fluid flow rate through said internal channel of said flow control chamber, said flow control chamber further comprising:
        a locking mechanism for locking said flow arresting element in a non-flow position, said locking mechanism actuated by a pressure reduction downstream of said flow control chamber, said locking of said flow arresting element occurring at a static fluid flow condition upon the condition of a gradual reduction in the downstream fluid pressure.

10. The leak arresting flow control valve of claim 9, where said flow arresting element occupies a first position within said internal channel of said flow control chamber at said static fluid flow rate, and occupies a second position within said internal channel of said flow control chamber above said minimum fluid flow rate, and where said fluid flow arresting element occupies a third position intermediate to said first position and said second position when said locking mechanism locks said flow arresting element in the non-flow position.

11. The leak arresting flow control valve of claim 10, wherein said flow arresting element has a sealing member cooperating with the internal channel of said flow control chamber to define an upstream pressure prior to said sealing member and a downstream pressure after said sealing member, and where said locking mechanism is actuated by a pressure differential across said sealing member of said flow arresting element.

12. The leak arresting flow control valve of claim 11, wherein said flow control chamber includes a fluid reservoir in fluidic communication with said internal channel via a capillary channel, said fluid reservoir further in fluidic communication with said locking mechanism, where a pressure at said capillary channel is communicated to said locking mechanism, and where a size of said capillary channel and a size of said fluid reservoir are selected to effect a predetermined delay in the communication of said pressure at said capillary channel to said locking mechanism.

13. The leak arresting flow control valve of claim 12, wherein said locking mechanism comprises a spring biased piston radially aligned with respect to said internal channel and disposed in a column in fluidic communication with said internal channel of said flow control chamber downstream of said capillary channel, where a higher pressure at said capillary channel compared to a pressure at said piston column causes said piston to deploy from a spring biased position preventing uninhibited movement of said flow arresting element to a deployed position and restricting movement of said flow arresting element to a position resulting in a non-flow condition.

14. The leak arresting flow control valve of claim 13, wherein said flow arresting element is biased in said first position by a spring under a static flow condition, the spring having a non-linear response in a fluid flow rate regime defined by a fluid flow rate between zero and approximately the minimum fluid flow rate, compared to a fluid flow rate regime defined by a fluid flow rate greater than approximately the minimum fluid flow rate.

15. The leak arresting flow control valve of claim 10, wherein said spring member has a non-linear response in a fluid flow rate regime defined by a fluid flow rate between zero and approximately the minimum fluid flow rate, compared to a fluid flow rate regime defined by a fluid flow rate greater than approximately the minimum fluid flow rate.

16. The leak arresting flow control valve of claim 9, wherein said locking mechanism disengages when the downstream pressure becomes substantially no less than an upstream pressure.

* * * * *